US006462505B1

(12) United States Patent
Spingler

(10) Patent No.: US 6,462,505 B1
(45) Date of Patent: Oct. 8, 2002

(54) METHOD FOR MONITORING A DRIVE, AND A DRIVE

(75) Inventor: Michael Spingler, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/677,969

(22) Filed: Oct. 3, 2000

(30) Foreign Application Priority Data

Oct. 5, 1999 (DE) ........................................ 199 47 837

(51) Int. Cl.[7] ................................................. H02P 5/28

(52) U.S. Cl. ....................... 318/798; 318/254; 318/138; 318/439; 318/560; 318/569; 318/567; 318/599

(58) Field of Search ................................ 318/254, 138, 318/439, 798, 560, 569, 599, 567; 388/811

(56) References Cited

U.S. PATENT DOCUMENTS

| | | | | | |
|---|---|---|---|---|---|
| 5,191,568 | A | * | 3/1993 | Muto et al. | 369/32 |
| 5,821,717 | A | * | 10/1998 | Hassan et al. | 318/560 |
| 6,124,689 | A | * | 9/2000 | Kardash | 318/254 |

* cited by examiner

*Primary Examiner*—Karen Masih
(74) *Attorney, Agent, or Firm*—Kenyon & Kenyon

(57) ABSTRACT

In a drive, a position and/or a speed of the drive are detected by a drive sensor. After being digitized by a feedback unit arranged on or in the drive, the position and/or the speed of the drive are transmitted to a superordinate drive control unit. At least one additional measurement quantity is detected on or in the drive by an additional sensor. The at least one additional measurement quantity is also digitized by the feedback unit before being transmitted to the superordinate drive control unit.

20 Claims, 2 Drawing Sheets

METHOD FOR MONITORING A DRIVE, AND A DRIVE

FIELD OF THE INVENTION

The present invention relates to a method for monitoring a drive, in particular an electric motor, where a position and/or a speed of the drive is detected by a drive sensor and is transmitted in digitized form to a superordinate drive control unit by a feedback unit arranged at or in a housing of the drive, where at least one further measurement quantity is detected by an additional sensor arranged at or in the housing. The present invention also relates to a corresponding drive.

BACKGROUND INFORMATION

Methods of monitoring a drive and drives are conventional.

For the operation and the monitoring of the operation of a drive and any auxiliary devices assigned to the drive, in addition to a position and/or a speed of the drive, additional measurement quantities are often detected by additional sensors arranged at or in the housing of the drive and transmitted to the drive control unit. In this case, a number of lines between drive and drive control unit are laid per additional sensor. This is laborious and expensive. Moreover, it is often necessary to implement complicated shielding measures in order to ensure that the detected additional measurement quantities are transmitted in a manner free from interference.

SUMMARY

An object of the present invention is to provide a method for monitoring a drive and a drive corresponding thereto by which simple, cost-effective transmission of the detected additional measurement quantities to the drive control unit is enabled, with the interference immunity of the data transmission being increased at the same time.

This object is achieved for a method according to the present invention by the fact that the at least one additional measurement quantity is transmitted to the drive control unit by the feedback unit in digitized form. This is advantageous because the feedback unit and the connection between it and the drive control unit are present in any case.

With respect to the drive according to the present invention, an additional sensor is connected to the feedback unit. This means that the detected additional measurement quantity can then be transmitted to the drive control unit via the feedback unit.

If the drive sensor and the feedback unit are combined to form an installation unit, a particularly compact structure results for drive sensor and feedback unit.

The at least one additional measurement quantity may be, e.g., a temperature prevailing in the drive, a drive vibration, a drive acceleration or a drive cooling state. It is also possible to detect a plurality of the measurement quantities mentioned and/or additional measurement quantities that are not individually enumerated here.

It is also possible for the at least one additional measurement quantity to be an auxiliary device state of an auxiliary device, e.g., a tool clamping device, assigned to the drive. In this case, therefore, a measurement quantity of an application-related additional unit, which is not necessary for operation of the drive as such, is detected. One example of such a measurement quantity is a position of the auxiliary device.

It is possible to transmit the position and/or the speed of the drive and the additional measurement quantity to the feedback unit already in digitized form. However, the position and/or the speed of the drive and the at least one additional measurement quantity may be digitized by the feedback unit.

The equipment outlay can be kept particularly low if the position and/or the speed of the drive and the at least one additional measurement quantity are fed via a multiplexer to a common A/D converter in the feedback unit.

The position and/or the speed of the drive and the at least one additional measurement quantity may have distinctly different signal levels. Therefore, the measurement accuracy can be improved if the position and/or the speed of the drive and the at least one additional measurement quantity are passed via a variable-gain amplifier between the multiplexer and the A/D converter in the feedback unit, and the gain is set so that the A/D converter is driven at a full level, but is not overdriven.

If the position and/or the speed of the drive and the at least one additional measurement quantity are transmitted serially to the drive control unit by the feedback unit, only a very small number of lines have to be laid between feedback unit and drive control unit.

If the position and/or the speed of the drive are transmitted with high priority, and the at least one additional measurement quantity with low priority, to the drive control unit, the transmission of the at least one additional measurement quantity has no, or only a small, influence on the regulating dynamic range of the drive.

DETAILED DESCRIPTION

Figure 1:
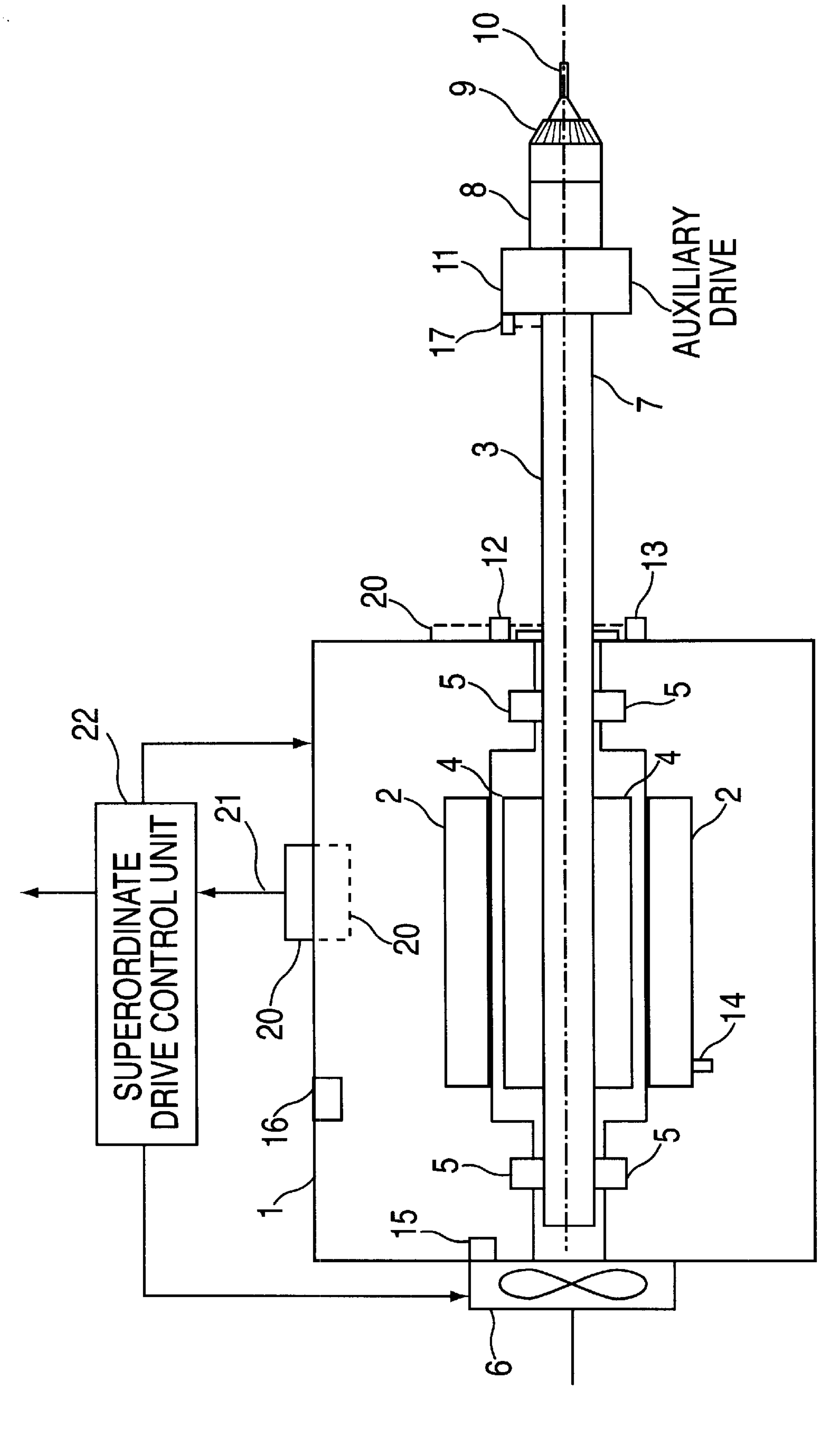
FIG. 1 shows an electric motor.

In accordance with FIG. 1, an electric motor as an example of a drive, has a drive housing 1. A stator 2 of the electric motor is fixed in the drive housing 1. The electric motor has a shaft 3, on which a rotor 4 of the electric motor is arranged in a fixed manner against rotation. The shaft 3 is rotatably mounted in bearings 5.

During operation of the electric motor, the stator 2 is energized by a current. The stator 2 is heated as a result of this. Therefore, depending on the degree of heating, it may be necessary to subject the stator 2 to forced cooling by means of a blower 6.

Because of the current, the stator 2 exerts a torque on the rotor 4. The shaft 3, therefore, rotates about a drive axis 7. Depending on the torque that is exerted and on external loading on the shaft 3, the rotation of the shaft 3 may be unaccelerated or accelerated.

In accordance with the exemplary embodiment, the electric motor drives a drilling spindle 8 with a drill chuck 9. The drilling spindle 8 is connected to the shaft 3 in a manner fixed against rotation. In order to accommodate different drills 10, the drill chuck 9 is adjustable via an auxiliary drive 11, which serves as a tool clamping device.

In order to detect an angular position and/or an angular velocity of the shaft 3, a drive sensor 12 is arranged at the drive housing 1. Furthermore, in order to detect an acceleration of the shaft 3, an acceleration sensor 13 is arranged at the drive housing 1. However, the drive sensor 12 and/or the acceleration sensor 13 could also be arranged in the drive housing 1.

In order to detect the heating of the stator 2, a temperature sensor 14 is arranged on the stator 2, for example in the drive housing 1. A temperature prevailing in the stator 2 and thus in the electric motor is detected via the temperature sensor 14.

The blower 6 is assigned a rotational speed sensor 15. An operating state of the blower 6 and thus indirectly a drive cooling state are determined via the output signal of the rotational speed sensor 15. Finally, a vibration sensor 16 also is arranged in the drive housing 1. A drive vibration is determined via the vibration sensor 16.

The auxiliary drive 11 is assigned an auxiliary sensor 17. A position of the auxiliary drive 11 (open or closed) is detected via the auxiliary sensor 17. Expressed more generally, the auxiliary sensor 17 detects an auxiliary device state of an auxiliary device. In this case the auxiliary drive 11 serves as a tool clamping device assigned to the electric motor.

Figure 2:
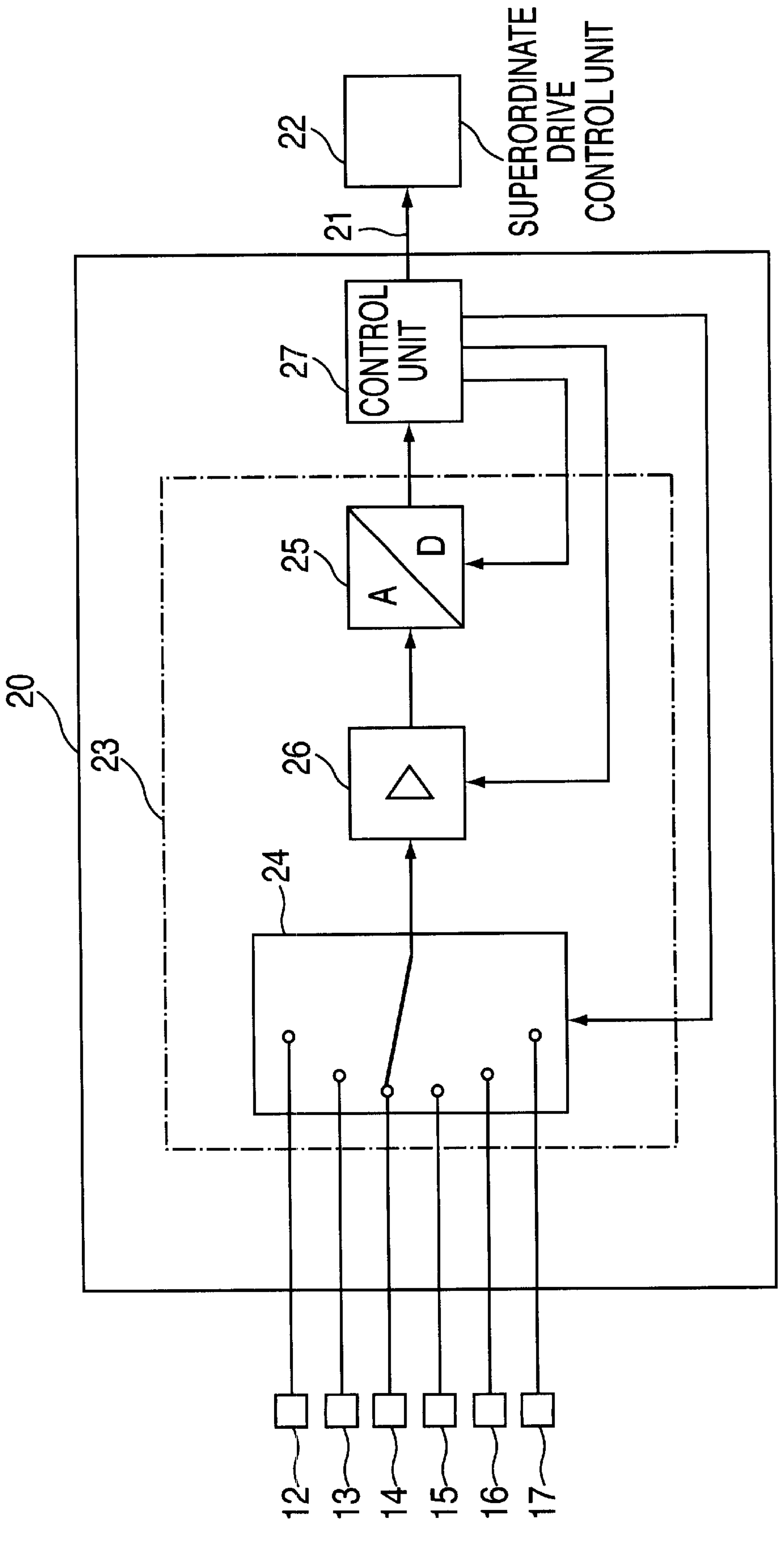
FIG. 2 shows a feedback unit.

In accordance with FIG. 2, the sensors 12–17 are connected to a feedback unit 20. The feedback unit 20 is in turn connected to a superordinate drive control unit 22 via a serial digital data link 21. Data are transmitted serially to the drive control unit 22 by the feedback unit 20. The data includes, for example, the measurement quantities supplied by the sensors 12–17.

The measurement quantities supplied by the sensors 12–17 are generally fed as analog signals to the feedback unit 20. The data transmission via the data link 21, by contrast, takes place digitally. Therefore, the measurement quantities supplied by the sensors 12–17 are digitized by the feedback unit 20. However, it is also possible for the measurement quantities supplied by the sensors 12–17 to be fed to the feedback unit 20 already in digitized form.

If the measurement quantities supplied by the sensors 12–17 are fed to the feedback unit 20 as analog signals, the feedback unit 20 has a digitization device 23 in order to digitize them. The digitization device 23 in turn has a multiplexer 24 and an A/D converter 25 arranged downstream of the multiplexer 24. An amplifier 26 is arranged between the multiplexer 24 and the A/D converter 25. The amplifier 26 has a variable gain.

First, the measurement quantities supplied by the sensors 12–17 are fed to the multiplexer 24. A control unit 27 controls the multiplexer 24 so that in each case one of the measurement quantities supplied by the sensors 12–17 is forwarded successively to the amplifier 26. Thereupon, the amplifier 26 supplies an analog output signal. The latter is fed to the A/D converter 25. The A/D converter 25 is shared by all the sensors 12–17. It converts the analog output signal into a digital output signal on the basis of a control command communicated by the control unit 27. The digital output signal of the respective measurement quantity is read into the control unit 27.

Depending on the read-in value of the digital output signal, the control unit 27 sets the gain of the amplifier 26 so that the A/D converter is driven at a full level, but not overdriven. The output signal that is then present is buffer-stored in the control unit 27—taking account of the gain that has been set. Finally, when all the measurement quantities have been digitized, they are transmitted digitally to the drive control unit 22.

The regulation of the electric motor requires a continual transmission of the position and/or the speed of the electric motor. Therefore, this measurement quantity or these measurement quantities are transmitted with high priority to the drive control unit 22. The measurement quantities supplied by the additional sensors 13–17, by contrast, need only be transmitted to the drive control unit 22 from time to time. Thus, in the case of these measurement quantities, it is sufficient if they are transmitted with low priority to the drive control unit 22.

In practice, in the case of data transmission from the feedback unit 20 to the drive control unit 22, it is possible, e.g., for the position and/or the speed to be constantly transmitted, in which case, one of the measurement quantities supplied by the additional sensors 13–17 is alternately transmitted as well. However, other transmission methods are also possible, e.g., transmission of the measurement quantities supplied by the additional sensors 13–17 only in the event of conspicuousness. In this case, the measurement quantities supplied by the additional sensors 13–17 would actually be pre-evaluated in the feedback unit 20.

The measurement quantities are evaluated by the drive control unit 22. For example, in the event of inadequate lubrication, the electric motor can be shut down and a fault message outputted. The blower 6 can also be activated e.g. on the basis of the temperature detected by the temperature sensor 14. These and other evaluations of the measurement quantities are generally conventional. Therefore, they do not need to be explained in detail.

In accordance with FIG. 1, the feedback unit 20 is arranged at the drive housing 1. However, as indicated dashed in FIG. 1, the feedback unit 20 could also be arranged in the drive housing 1. Likewise, it is also possible for the drive sensor 12 and the feedback unit 20 to be combined to form an installation unit. In this case, the drive sensor 12 and the feedback unit 20 can be mounted and demounted together in the form of the installation unit. This variant is also indicated dashed in FIG. 1.

Finally, it shall also be mentioned that the present invention can, of course, also be applied to a linear motor. In this case, a linear position and/or a linear velocity would be detected instead of an angular position and/or an angular velocity. Moreover, the present invention is not restricted to electric drives. It could also likewise be used in hydraulic or pneumatic drives (rotatory or linear).

What is claimed is:

1. A method for monitoring a drive, comprising:

detecting at least one of a position and a speed of a drive by a drive sensor;

transmitting the at least one of the position and the speed of the drive in digitized form to a superordinate drive control unit by a feedback unit, the feedback unit being arranged at or in a housing of the drive;

detecting at least one additional measurement quantity by at least one additional sensor, the at least one additional sensor being arranged at or in the housing of the drive; and transmitting the at least one additional measurement quantity in digitized form to the superordinate drive control unit by the feedback unit.

2. The method according to claim 1, wherein:

the drive is an electric motor.

3. The method according claim 1, wherein:

the at least one additional measurement quantity includes a temperature prevailing in the drive, a drive vibration, a drive acceleration, or a drive cooling state.

4. The method according to claim 1, wherein:

the at least one additional measurement quantity includes an auxiliary device state of an auxiliary device assigned to the drive.

5. The method according to claim 4, wherein:

the auxiliary device state includes a position of the auxiliary device.

6. The method according to claim 1, wherein the at least one of the position and the speed of the drive and the at least one further measurement are digitized by the feedback unit.

7. The method according to claim 1, further comprising:

feeding via a multiplexer the at least one of the position and the speed of the drive and the at least one additional measurement quantity to a common A/D converter.

8. The method according to claim 7, further comprising:

passing via a variable gain amplifier the at least one of the position and the speed of the drive and the at least one additional measurement quantity between the multiplexer and the A/D converter, the gain being set so that the A/D converter is driven at a full level without being overdriven.

9. The method according to claim 1, wherein the at least one of the position and the speed of the drive and the at least one additional measurement quantity are serially transmitted to the superordinate drive control unit by the feedback unit.

10. The method according to claim 1, wherein:

the at least one of the position and the speed of the drive is transmitted to the superordinate drive control unit with high priority; and the at least one additional measurement quantity is transmitted to the superordinate drive control unit with low priority.

11. A drive, comprising:

a drive housing;

a drive sensor arranged at or in the drive housing, the drive sensor to detect at least one of a position and a speed of the drive;

a feedback unit connected to the drive sensor, the feedback unit being arranged at or in the drive housing;

at least one additional sensor arranged at or in the drive housing, the at last one additional sensor being connected to the feedback unit, the at least one additional sensor to detect at least one additional measurement quantity of the drive; and a superordinate drive control unit connected to the feedback unit via a digital data link, to transmit in digitized form the least one of the detected position and speed and the additional measurement quantity from the feedback unit to the subordinate drive control unit.

12. The drive according to claim 11, wherein:

the drive is an electric motor.

13. The drive according to claim 11, wherein:

the drive sensor and the feedback unit form an installation unit.

14. The drive according to claim 11, wherein:

the at least one additional measurement quantity includes a temperature prevailing in the drive, a drive vibration, a drive acceleration, or a drive cooling state.

15. The drive according to claim 11, wherein:

the at least one additional measurement quantity includes an auxiliary device state of an auxiliary device assigned to the drive.

16. The drive according to claim 15, wherein:

the auxiliary device state includes a position of the auxiliary device.

17. The drive according to claim 11, wherein:

the at least one of the position and the speed of the drive and the at least one additional measurement quantity are fed as analog signals to the feedback unit; and the feedback unit includes a digitization device.

18. The drive according to claim 17, wherein:

the digitization device includes a multiplexer and an A/D converter arranged downstream of the multiplexer.

19. The drive according to claim 17, further comprising:

a variable-gain amplifier arranged between the multiplexer and the A/D converter.

20. The drive according to claim 11, wherein:

the data link is a serial data link.

* * * * *